US011777172B2

(12) United States Patent
Choi et al.

(10) Patent No.: US 11,777,172 B2
(45) Date of Patent: Oct. 3, 2023

(54) BATTERY PACK

(71) Applicant: SAMSUNG SDI CO., LTD., Yongin-si (KR)

(72) Inventors: Seonung Choi, Yongin-si (KR); Jieon Kim, Yongin-si (KR); Hoomin Lee, Yongin-si (KR); Jaelim Ryu, Yongin-si (KR); Hanho Kim, Yongin-si (KR); Jonghyun Lee, Yongin-si (KR); Taekyung Lee, Yongin-si (KR)

(73) Assignee: SAMSUNG SDI CO., LTD., Yongin-si (KR)

( * ) Notice: Subject to any disclaimer, the term of this patent is extended or adjusted under 35 U.S.C. 154(b) by 181 days.

(21) Appl. No.: 17/215,344

(22) Filed: Mar. 29, 2021

(65) Prior Publication Data

US 2021/0313648 A1  Oct. 7, 2021

(30) Foreign Application Priority Data

Apr. 1, 2020  (KR) ........................ 10-2020-0039948

(51) Int. Cl.
*H01M 50/291* (2021.01)
*H01M 50/249* (2021.01)
*H01M 50/209* (2021.01)
*H01M 50/244* (2021.01)
*H01M 50/547* (2021.01)

(52) U.S. Cl.
CPC ....... *H01M 50/291* (2021.01); *H01M 50/209* (2021.01); *H01M 50/244* (2021.01); *H01M 50/249* (2021.01); *H01M 50/547* (2021.01); *H01M 2220/20* (2013.01)

(58) Field of Classification Search
CPC ............. H01M 50/291; H01M 50/209; H01M 50/244; H01M 50/249; H01M 50/547; H01M 2220/20; H01M 50/20; H01M 50/264; H01M 50/293; Y02E 60/10
See application file for complete search history.

(56) References Cited

U.S. PATENT DOCUMENTS 7,740,978 B2    6/2010  Hamada et al.
8,309,247 B2 *  11/2012  Shinyashiki ........ H01M 50/224
                                                429/152
(Continued)

FOREIGN PATENT DOCUMENTS

CN    203071146 U    7/2013
CN    104576987 A    4/2015
(Continued)

OTHER PUBLICATIONS

European Search Report dated Aug. 19, 2021.
(Continued)

*Primary Examiner* — Michael L Dignan
(74) *Attorney, Agent, or Firm* — Lee IP Law, P.C.

(57) ABSTRACT

A battery pack including m number of battery cells arranged in a first direction; and spacers on the battery cells, the spacers each including a plurality of spacer units arranged in the first direction, wherein each of the spacer units extends across n number of battery cells, in which n<m, and each of the spacer units includes a plurality of spacing bars, each spacing bar being between adjacent ones of the battery cells, and connection bars connecting the plurality of spacing bars to each other.

25 Claims, 9 Drawing Sheets

(56) References Cited

U.S. PATENT DOCUMENTS

| | | |
|---|---|---|
| 9,159,970 B2 | 10/2015 | Watanabe et al. |
| 9,912,024 B2 | 3/2018 | Ejiri et al. |
| 2008/0299453 A1 | 12/2008 | Shinyashiki et al. |
| 2011/0059342 A1* | 3/2011 | Lee .................... H01M 50/204 429/93 |
| 2011/0236739 A1* | 9/2011 | Watanabe .......... H01M 50/209 429/99 |
| 2014/0087229 A1* | 3/2014 | Watanabe .......... H01M 50/271 429/99 |
| 2014/0212722 A1* | 7/2014 | Lee .................... H01M 50/121 429/99 |
| 2015/0118530 A1 | 4/2015 | Lee |
| 2015/0270589 A1* | 9/2015 | Ejiri .................... H01M 10/613 429/72 |
| 2021/0143508 A1* | 5/2021 | Yoshida .............. H01M 10/613 |

FOREIGN PATENT DOCUMENTS

| | | |
|---|---|---|
| CN | 104904060 A | 9/2015 |
| CN | 207637858 U | 7/2018 |
| JP | 2012-022937 A | 2/2012 |
| JP | 2012-059581 A | 3/2012 |
| JP | 5196876 B2 | 5/2013 |
| JP | 5334420 B2 | 11/2013 |
| JP | 5490652 B2 | 5/2014 |
| KR | 10-1826090 B1 | 2/2018 |
| WO | WO 2004/112172 A1 | 12/2004 |

OTHER PUBLICATIONS

Chinese Office action dated Nov. 1, 2022.
Chinese Office Action dated May 11, 2023 for corresponding CN Application No. 202110354382.8.

\* cited by examiner

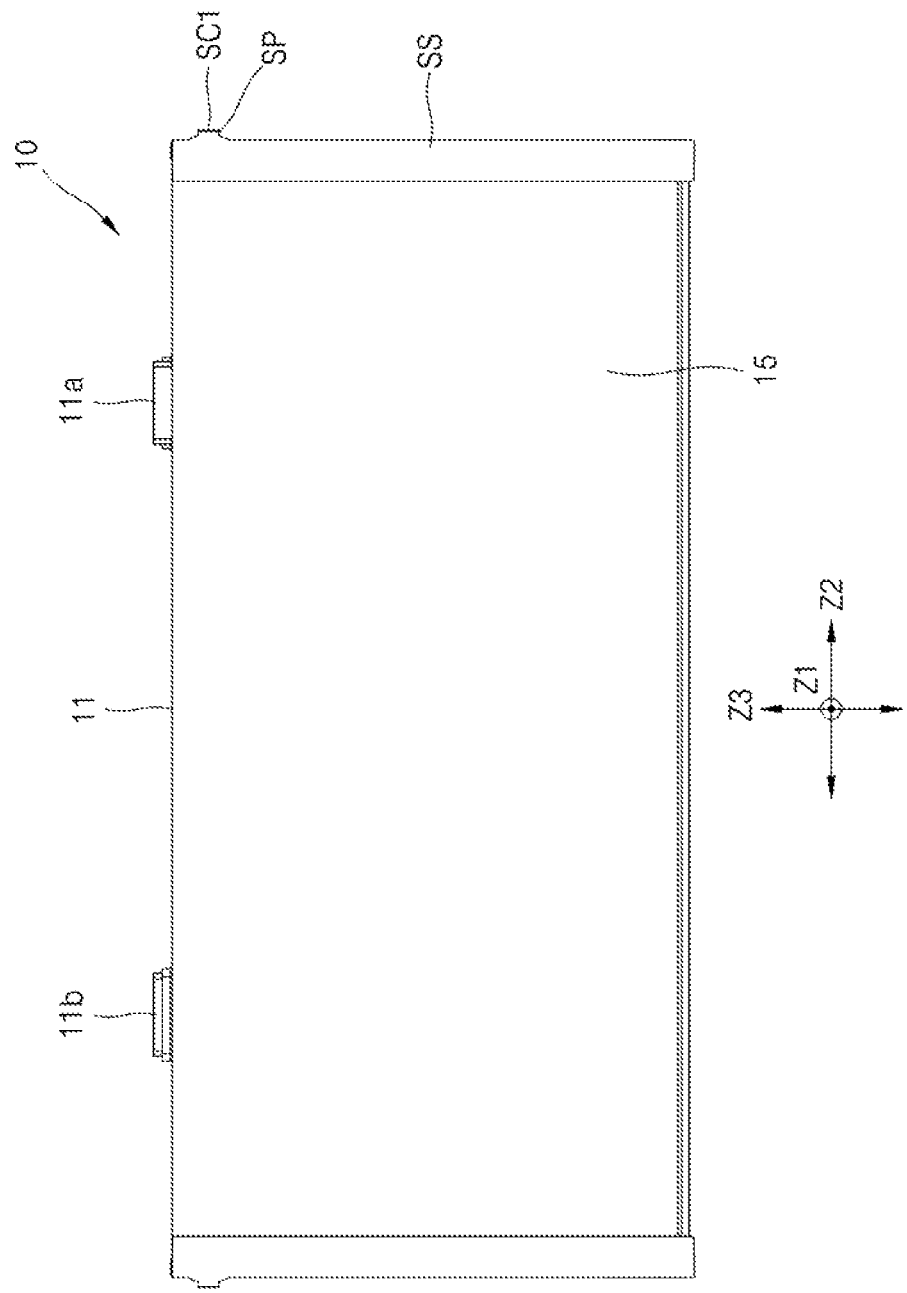

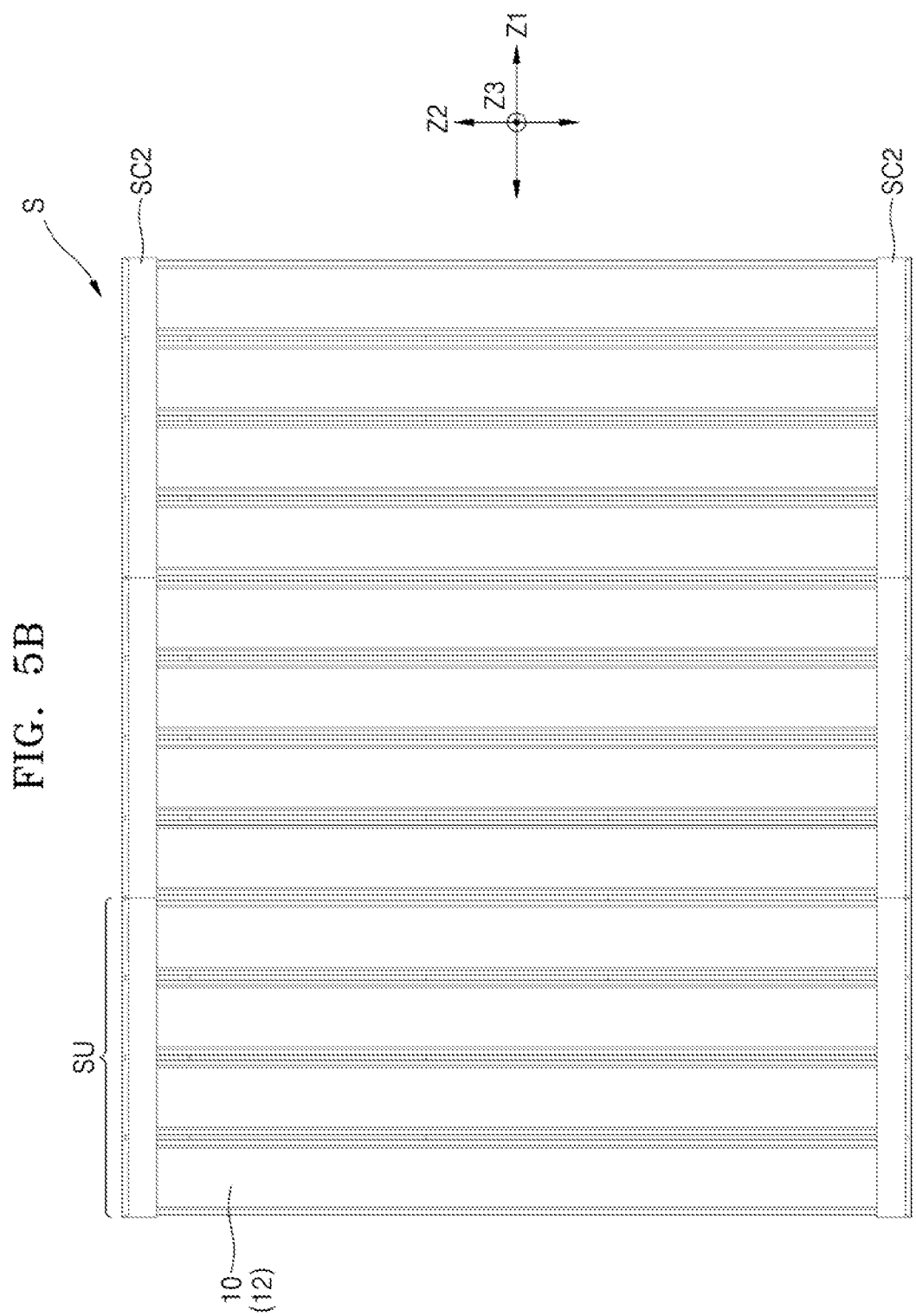

BATTERY PACK

CROSS-REFERENCE TO RELATED APPLICATION

Korean Patent Application No. 10-2020-0039948, filed on Apr. 1, 2020 in the Korean Intellectual Property Office, and entitled: "Battery Pack," is incorporated by reference herein in its entirety.

BACKGROUND

1. Field

Embodiments relate to a battery pack.

2. Description of Related Art

Secondary batteries are rechargeable unlike non-rechargeable primary batteries. Secondary batteries may be used as energy sources of devices such as mobile devices, electric vehicles, hybrid electric vehicles, electric bicycles, and uninterruptible power supplies, and according to the types of external devices using secondary batteries, secondary batteries may be used as single battery cells or battery packs in which a plurality of battery cells are connected into a unit.

SUMMARY

The embodiments may be realized by providing a battery pack including m number of battery cells arranged in a first direction; and spacers on the battery cells, the spacers each including a plurality of spacer units arranged in the first direction, wherein each of the spacer units extends across n number of the battery cells, in which n<m, and each of the spacer units includes a plurality of spacing bars, each of the spacing bars being between adjacent ones of the battery cells, and connection bars connecting the plurality of spacing bars to each other.

With respect to a number n of battery cells that one spacer unit extends across, a total number m of battery cells may be a multiple of the number n of battery cells that one spacer unit extends across.

The m number of battery cells arranged in the first direction may be arranged in two or more modules, and each of the modules may include k number of battery cells, in which k<m.

m may be a positive integer multiple of k such that m=p*k, in which p is a positive integer.

k may be a positive integer multiple of n such that k=p*n, in which p is a positive integer.

The battery pack may further include a pair of first end blocks respectively at a front end and a rear end of the m number of battery cells arranged in the first direction; and a second end block between adjacent modules of the two or more modules, wherein the first end blocks may each have substantially the same structure as the second end block.

The plurality of spacing bars may be arranged in the first direction such that a pair of the spacing bars face each other in a second direction intersecting with the first direction with a battery cell therebetween, and each of the spacing bars may extend lengthwise in a third direction intersecting with the first direction and the second direction.

Each of the battery cells may include a terminal surface including at least one electrode terminal thereon, a bottom surface opposite to the terminal surface, a pair of large surfaces that connect the terminal surface to the bottom surface and that each have a first area, and a pair of lateral surfaces that connect the terminal surface to the bottom surface and that each have a second area, the second area being smaller than the first area.

The plurality of spacing bars may be respectively between the large surfaces of adjacent battery cells.

The plurality of spacing bars may protrude from the connection bars on the lateral surfaces of the battery cells in a second direction intersecting with the first direction, and may be respectively between the large surfaces of adjacent battery cells.

Each of the spacer units may include the spacing bars at both ends thereof and at central portions between the ends thereof, in the first direction, the spacer units may be adjacent to each other in the first direction, spacing bars of the plurality of spacing bars at the ends of adjacent spacer units may overlap each other and are between adjacent ones of the battery cells, and spacing bars of the plurality of spacing bars at the central portions of a corresponding spacer unit may be between adjacent ones of the battery cells.

Spacing bars of the plurality of spacing bars at the ends of one spacer unit may have a thickness that is half of a thickness of the plurality of spacing bars at the central portion of the one spacer unit.

The connection bars may extend in the first direction and connect the plurality of spacing bars arranged in the first direction.

The connection bars may include a lateral connection bar extending in the first direction across lateral surfaces of the battery cells; and a bottom connection bar extending in the first direction across bottom surfaces of the battery cells.

The lateral connection bar may extend across outer surfaces of the plurality of spacing bars in a second direction intersecting with the first direction, and the bottom connection bar may extend across bottom surfaces of the plurality of spacing bars in a third direction intersecting with the first direction and the second direction.

The lateral connection bar and the bottom connection bar may be spaced apart from each other in a third direction that intersects with the first direction and intersects a second direction in which the lateral surfaces of the battery cells adjacent to each other face.

The lateral connection bar may face the lateral surfaces of the battery cells, and the bottom connection bar may face the bottom surfaces of the battery cells.

The bottom connection bar may support bottom surfaces of the battery cells.

The battery pack may further include side plates extending in the first direction and covering outer sides of the spacers; and a pair of first end blocks arranged at a front side of a foremost battery cell of the m number of battery cells arranged in the first direction and at a rear side of a rearmost battery cell of the m number of battery cells arranged in the first direction.

The side plate may cover lateral surfaces of the battery cells, the spacers being between the side plate and the lateral surfaces of the battery cells, and the first end blocks may cover large surfaces of the foremost battery cell of the m number of battery cells arranged in the first direction and the rearmost battery cell of the m number of battery cells arranged in the first direction.

The spacers and the side plates may be in pairs that face each other with the battery cells therebetween in a second direction intersecting with the first direction.

The m number of battery cells may be arranged in the first direction in two or more modules, in which k number of battery cells are in each module, and in which k<m, and the side plates may include two or more side plates coupled to each other on each module.

The first and second end blocks may each include hollow coupling holes at opposite ends thereof in a second direction intersecting with the first direction.

The first end blocks may each include coupling blocks at opposite ends thereof in in a second direction intersecting with the first direction, the side plate may include coupling ends at opposite ends thereof, and the coupling blocks may be aligned with the coupling ends.

The battery pack may further include bus bar holders on terminal surfaces of the battery cells, wherein the side plate includes a protruding piece that protrudes from a body of the side plate covering lateral surfaces of the battery cells toward the terminal surfaces and supports the terminal surfaces by supporting an edge of the bus bar holder.

Each of the spacer units may be the same size, and m may be a positive integer multiple of n such that m=p*n, in which p is a positive integer.

BRIEF DESCRIPTION OF THE DRAWINGS

Features will be apparent to those of skill in the art by describing in detail exemplary embodiments with reference to the attached drawings in which:

FIG. 5A is a diagram of the spacers assembled as seen on a large surface of the battery cell, FIG. 5B is a diagram of the spacers assembled as seen below bottom surfaces of the battery cells.

DETAILED DESCRIPTION

Figure 1:
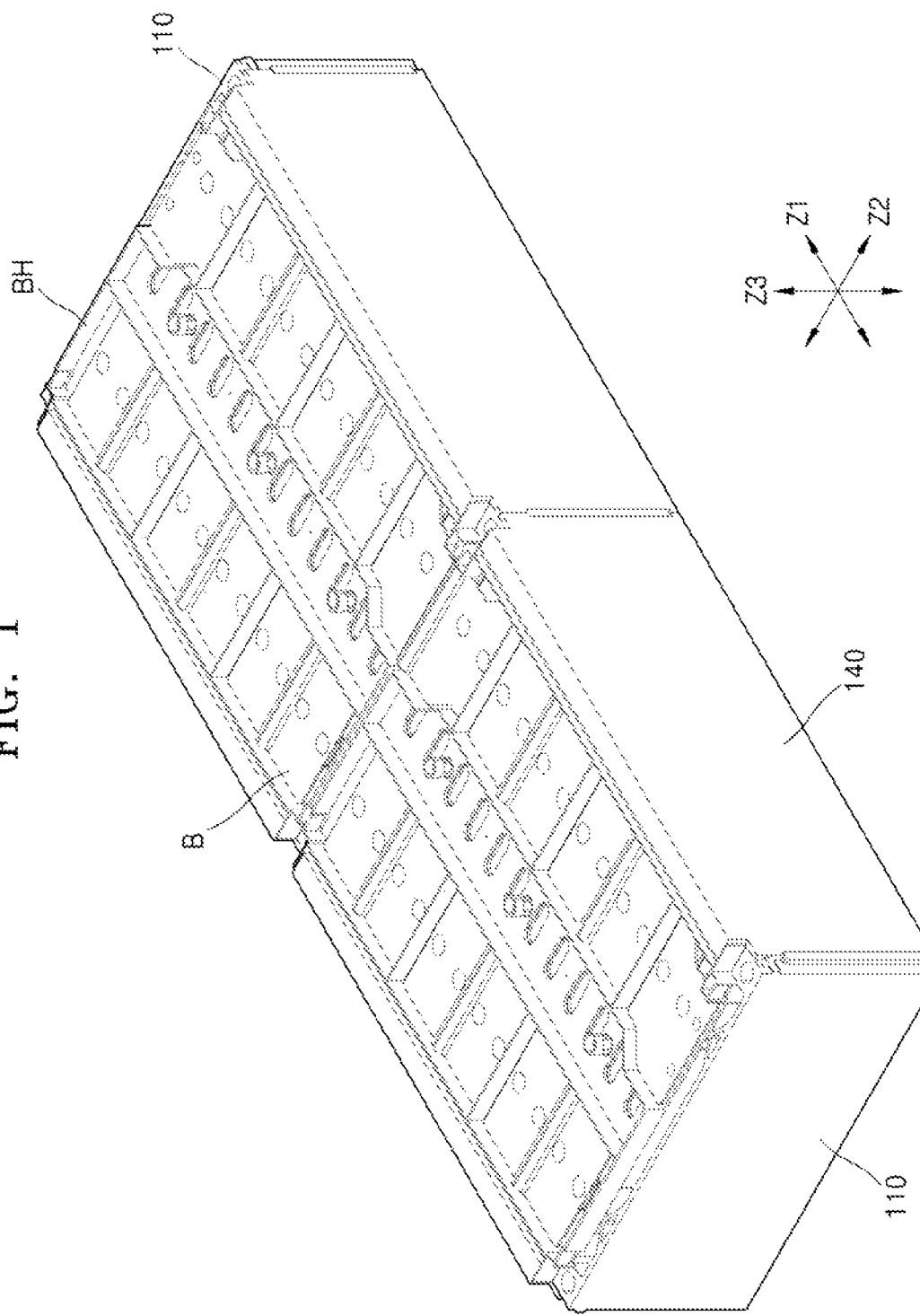
FIG. 1 is a perspective view of a battery pack according to an embodiment.

Example embodiments will now be described more fully hereinafter with reference to the accompanying drawings; however, they may be embodied in different forms and should not be construed as limited to the embodiments set forth herein. Rather, these embodiments are provided so that this disclosure will be thorough and complete, and will fully convey exemplary implementations to those skilled in the art.

In the drawing figures, the dimensions of layers and regions may be exaggerated for clarity of illustration. It will also be understood that when a layer or element is referred to as being "on" another layer or element, it can be directly on the other layer or element, or intervening layers may also be present. In addition, it will also be understood that when a layer is referred to as being "between" two layers, it can be the only layer between the two layers, or one or more intervening layers may also be present. Like reference numerals refer to like elements throughout.

As used herein, the terms "or" and "and/or" are not exclusive terms and include any and all combinations of one or more of the associated listed items. Expressions such as "at least one of," when preceding a list of elements, modify the entire list of elements and do not modify the individual elements of the list.

Hereinafter, a battery pack according to an embodiment will be described with reference to the accompanying drawings.

Figure 2:
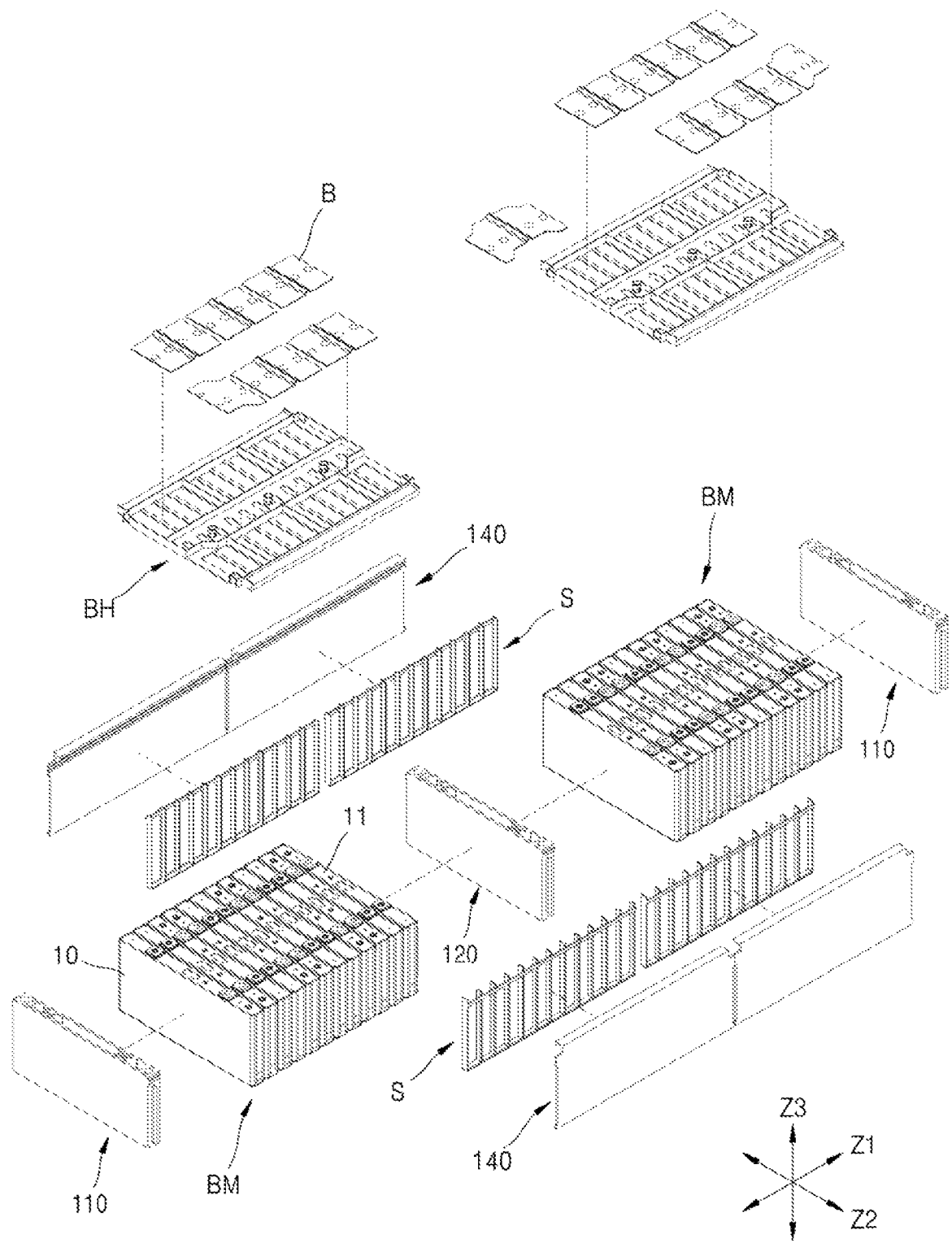
FIG. 2 is an exploded perspective view of the battery pack of FIG. 1.
Figure 3:
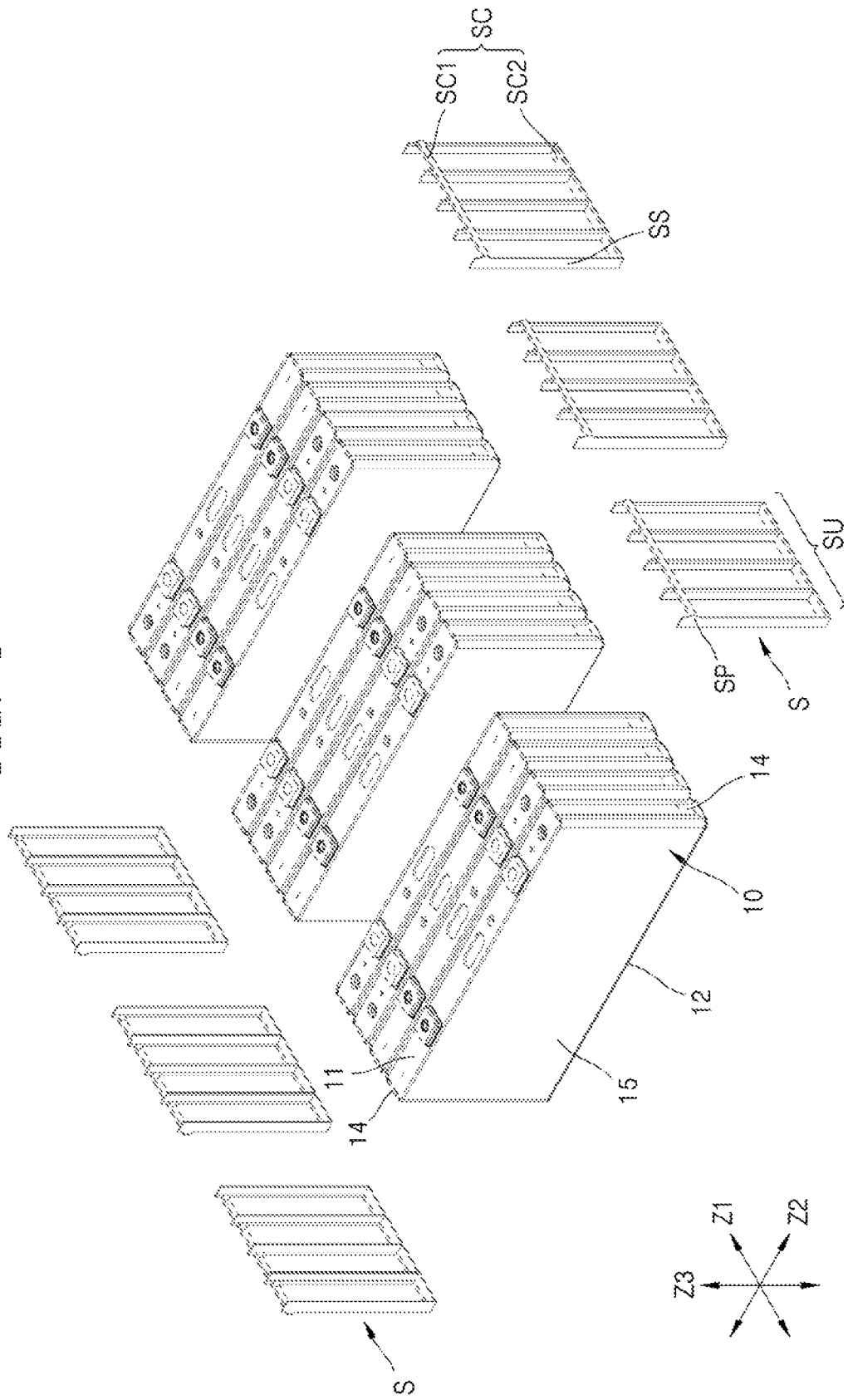
FIG. 3 is a perspective view of an assembly of battery cells and spacers.
Figure 4:
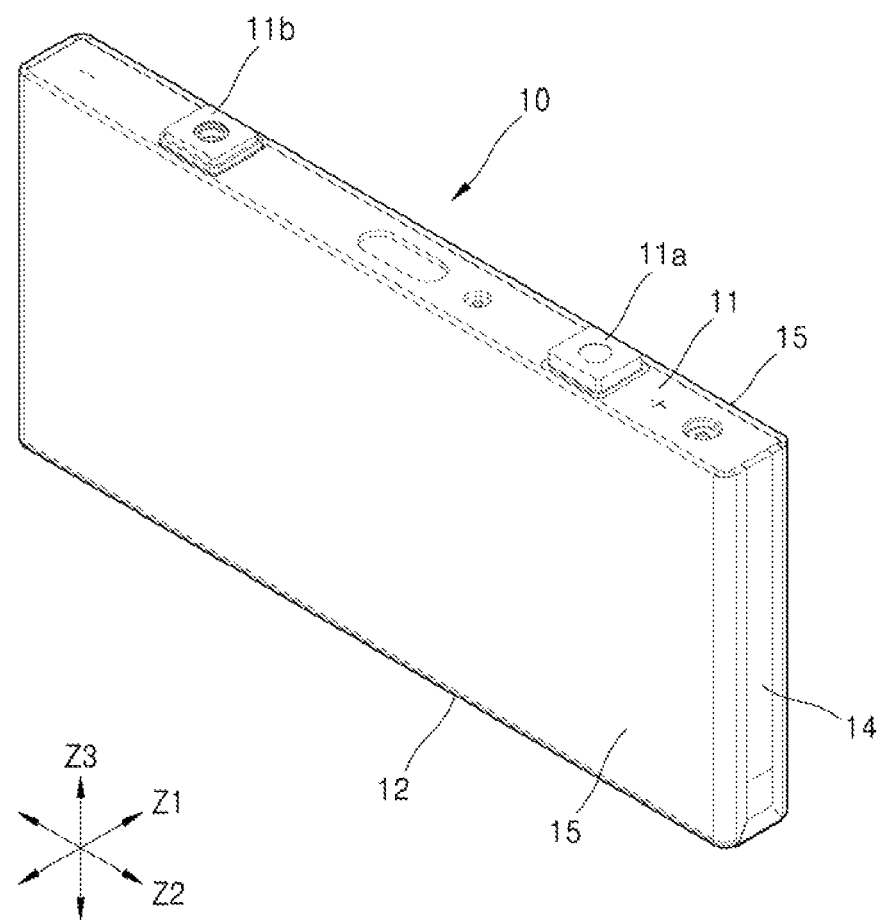
FIG. 4 is a perspective view of the battery cell of FIG. 2.
Figure 6:
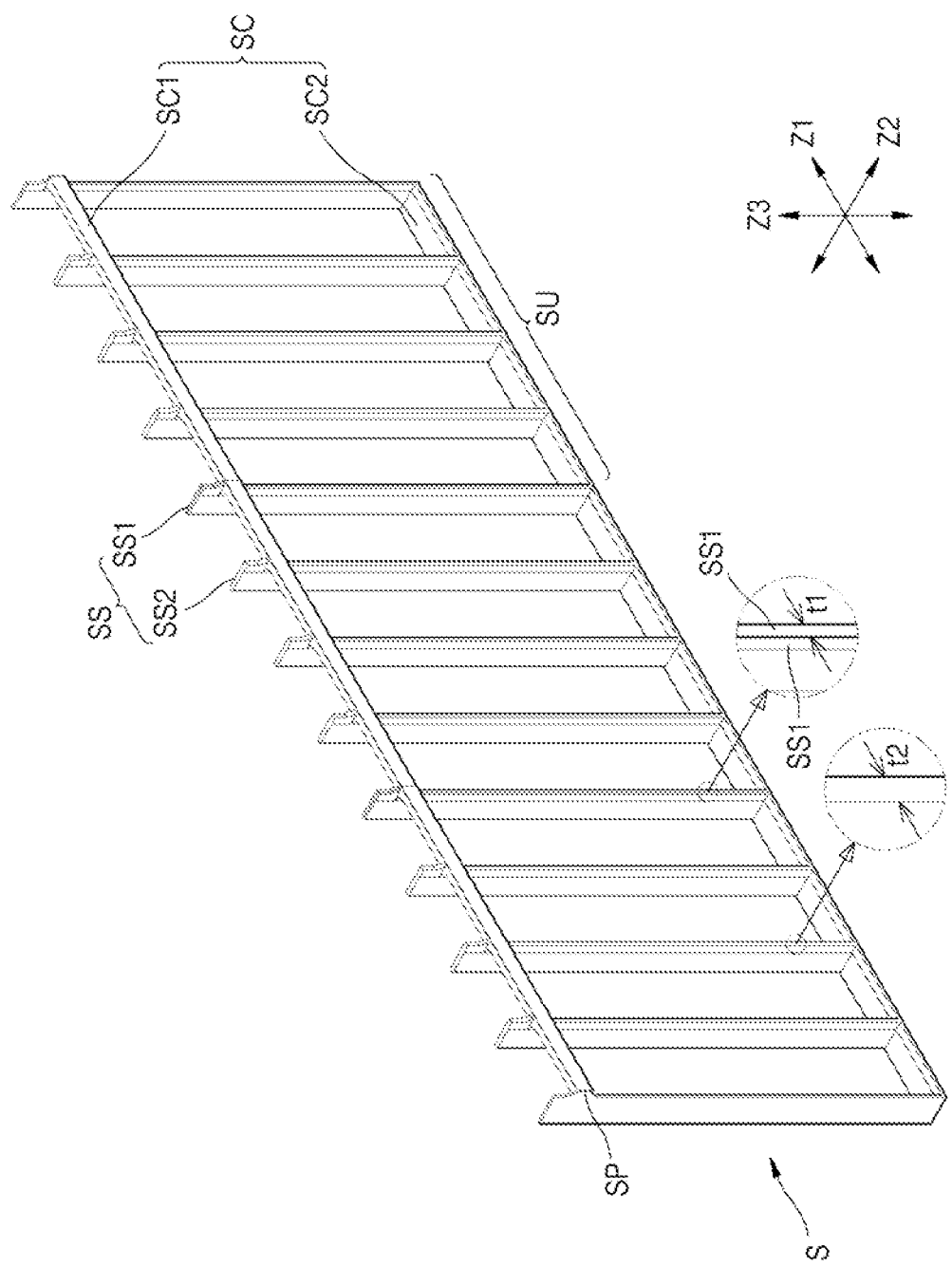
FIG. 6 is a perspective view of spacer units arranged continuously.
Figure 7:
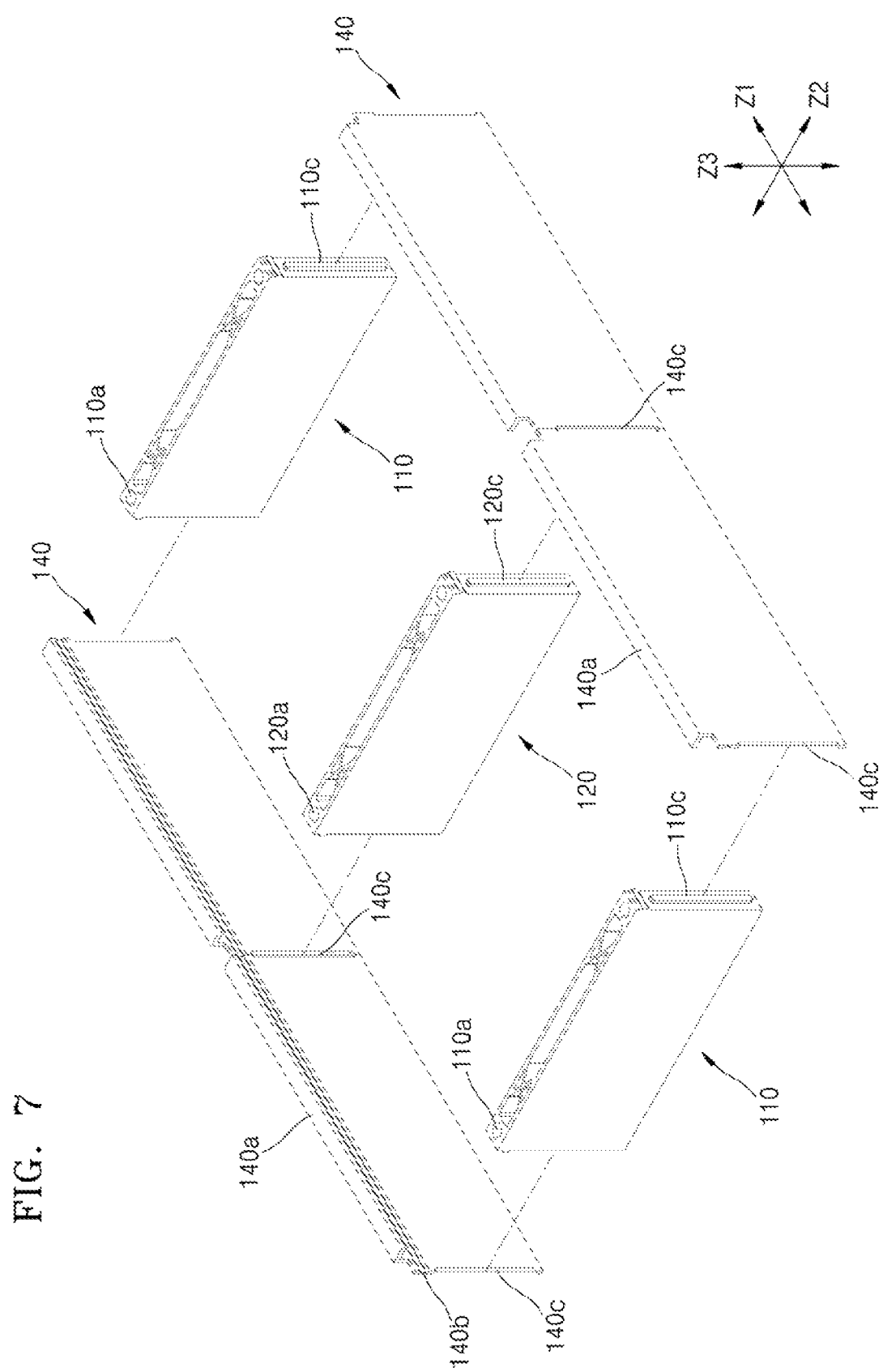
FIG. 7 is a diagram of coupling between first and second end blocks and a side plate illustrated in FIG. 2.

FIG. 1 is a perspective view of a battery pack according to an embodiment. FIG. 2 is an exploded perspective view of the battery pack of FIG. 1. FIG. 3 is a perspective view of an assembly of battery cells and spacers. FIG. 4 is a perspective view of the battery cell of FIG. 2. FIGS. 5A to 6 are diagrams of the spacer of FIG. 2, e.g., FIG. 5A is a diagram of the spacers assembled as seen on a large surface of the battery cell, FIG. 5B is a diagram of the spacers assembled as seen below bottom surfaces of the battery cells, and FIG. 6 is a perspective view of spacer units arranged continuously. FIG. 7 is a diagram of coupling between first and second end blocks and a side plate illustrated in FIG. 2.

Referring to FIGS. 2 and 3, a battery pack according to an embodiment may include m (e.g., 24) number of battery cells 10 arranged in or along a first direction Z1, and spacers S each including a plurality of spacer units SU arranged in or along the first direction Z1. In an implementation, each of the spacer units SU may extend across or along n (e.g., 4) number of battery cells 10, in which n<m. In an implementation, each of the spacer units SU may include a plurality of spacing bars SS (each of which being between adjacent battery cells), and connection bars SC (connecting the plurality of spacing bars SS to each other). In an implementation, the battery pack may include side plates 140 extending (e.g., lengthwise) in the first direction Z1 and covering outer sides of the spacers S, and a pair of first end blocks 110 at a front and a rear of the (e.g., row of) battery cells 10 in the first direction Z1.

Hereinafter, the battery pack of the present disclosure will be described in more detail.

Referring to FIGS. 2 and 4, the battery cell 10 may include a terminal surface 11 (including electrode terminals 11a and 11b thereon), a bottom surface 12 (opposite to the terminal surface 11), large surfaces 15 (connecting the terminal surface 11 to the bottom surface 12 and occupying a relatively large or first area), and lateral surfaces 14 (connecting the terminal surface 11 to the bottom surface 12 and occupying a relatively small second area). For example, the second area may be smaller than the first area. In an implementation, the electrode terminals 11a and 11b may be a pair of first and second electrode terminals 11a and 11b having different polarities, and the first and second electrode terminals 11a and 11b may be arranged or spaced apart along a second direction Z2 intersecting with the first direction Z1 (in which the battery cells 10 are arranged). In an implementation, any one of the first and second electrode terminals 11a and 11b may be omitted, in which case, a portion of an outer surface of the battery cell 10 may function as the omitted one of the electrode terminals 11a and 11b.

The large surfaces 15 of the battery cell 10 may be or include a pair of large surfaces 15 that are at both, e.g., opposite, sides of the battery cell 10 in the first direction Z1. The battery cells 10 may be (e.g., repeatedly) arranged in or along the first direction Z1, and the battery cells 10 adjacent to each other may have the large surfaces 15 thereof facing each other. Among the m battery cells 10 (e.g., 24 battery cells 10) arranged in the first direction Z1, the foremost and rearmost large surfaces 15 of the battery cells 10 arranged in the first direction Z1 (e.g., battery cells 10 at ends of the row of m battery cells 10) may be covered by a pair of the first end blocks 110, respectively.

The lateral surfaces 14 of the battery cell 10 may be or include a pair of lateral surfaces 14 at both, e.g., opposite, sides of the battery cell 10 in the second direction Z2. The spacer S may secure a gap between the battery cells 10 adjacent to each other and the side plate 140 may cover an outer side of the spacer S, and may be sequentially arranged on the lateral surfaces 14. In an implementation, the spacers S and the side plates 140 may be arranged in pairs to face each other with the battery cells 10 therebetween in the second direction Z2, and may be fixed on the lateral surfaces 14 at both sides of the battery cells 10. In an implementation, the second direction Z2 may be a direction perpendicularly intersecting with the first direction Z1.

Referring to FIGS. 2 and 3, the spacer S may include the plurality of spacer units SU arranged in or along the first direction Z1. In an implementation, the plurality of spacer units SU may have substantially the same shape, the plurality of spacer units SU having substantially the same shape may be continuously arranged in the first direction Z1, and accordingly, the spacer S may extend entirely across or along the plurality of battery cells 10 arranged in the first direction Z1 (e.g., each of the battery cells 10 may include a spacer unit SU thereon).

In an implementation, in the case where m battery cells 10 (e.g., 24 battery cells 10) are arranged in the first direction Z1, each of the spacer units SU may extend across n number of battery cells 10 (e.g., 4 battery cells 10) (in which n<m). In this case, with respect to the number n (e.g., 4) of battery cells 10 that one spacer unit SU extends across in the first direction Z1, the total number m (e.g., 24) of battery cells 10 may be a multiple of the number n (e.g., 4) of battery cells 10 that one spacer unit SU extends across. In an implementation, m may be p*n, in which p is a positive integer. In an implementation, the plurality of spacer units SU that each extend across the number n (e.g., 4) of battery cells 10 may be consecutively arranged in the first direction Z1 to form the spacer S that extends across the total number m (e.g., 24) of battery cells 10.

In an implementation, in the case where the battery pack according to an embodiment includes 24 battery cells 10, the spacer S extending across all the 24 battery cells 10 may be implemented by continuously arranging 6 spacer units SU, and each spacer unit SU may extend across or along 4 battery cells 10 in the first direction Z1.

The battery pack according to the present disclosure may be configured to be expandable in a module BM. The battery pack according to an embodiment may include m battery cells 10 (e.g., 24 battery cells 10) arranged in the first direction Z1. In an implementation, the m battery cells 10 (e.g., 24 battery cells 10) may be arranged in two or more modules BM, in which k (k<m) number of battery cells 10 (e.g., 12 battery cells 10) are in each module BM. In this case, the spacer S extending entirely across the k number of battery cells 10 (e.g., 12 battery cells 10) constituting one module BM may be implemented as a continuous arrangement of a plurality of spacer units SU each extending across the n battery cells 10 (e.g., 4 battery cells 10), and the number k of battery cells 10 (e.g., 12 battery cells 10) constituting one module BM may be a multiple of the number n of battery cells 10 (e.g., 4 battery cells 10) that one spacer unit SU extends across.

In an implementation, the battery pack according to an embodiment may include a total of 24 battery cells 10, in two modules BM each including 12 battery cells 10, and each of the modules BM that includes the 12 battery cells 10 may include three spacer units SU each extending across four battery cells 10 such that the three spacers S extend across the 12 battery cells 10 included in one module BM.

Referring to FIGS. 3 and 5A to 6, a structure of the spacer unit SU will be described in more detail. The spacer unit SU may include a plurality of spacing bars SS between adjacent battery cells 10, and a plurality of connection bars SC connecting the plurality of spacing bars SS to each other. The spacing bars SS may be arranged in front and rear of each of the battery cells 10 in the first direction Z1, to secure a gap between the adjacent battery cells 10. The spacing bar SS may provide a gap that may accommodate swelling of the battery cells 10 during charging and discharging, and may accommodate volume expansion caused by the swelling between the adjacent battery cells 10, thereby reducing or preventing excessive stress from being generated between the adjacent battery cells 10 and reducing or preventing structural binding of the battery pack along an arrangement direction of the battery cells 10 from deteriorating due to accumulation of the excessive stress.

The spacing bar SS may be between the large surfaces 15 of the battery cells 10 adjacent to each other in the first direction Z1, and may be between the large surfaces 15 of the battery cells 10 while protruding from a position corresponding to the lateral surfaces 14 of the battery cells 10 in the second direction Z2. A plurality of spacing bars SS may be arranged or spaced apart in the first direction Z1 to be between the battery cells 10 adjacent to each other in the first direction Z1. In this case, each of the spacing bars SS may extend lengthwise in a third direction Z3 intersecting with the first direction Z1 and the second direction Z2, and may be between the adjacent battery cells 10 over or along a total height of the large surface 15 of the battery cell 10 (from the terminal surface 11 to the bottom surface 12 of the battery cell 10 in the third direction Z3). The third direction Z3 may be a direction perpendicularly intersecting with the first and second directions Z1 and Z2 in an embodiment.

The spacer unit SU may further include connection bars SC extending across the plurality of spacing bars SS arranged in the first direction Z1 to connect the plurality of spacing bars SS to each other. The connection bars SC may extend (e.g., lengthwise) in the first direction Z1, may connect the plurality of spacing bars SS arranged in the first direction Z1 to constitute or form the spacer unit SU as one part, and may connect the plurality of spacing bars SS each between the large surfaces 15 of the battery cells 10 to secure rigidity of the entire battery pack in the first direction Z1. A battery pack may include m number of battery cells 10 (e.g., 24 battery cells 10) arranged in the first direction Z1, and a slip could occur between the battery cells 10 adjacent to each other, thereby causing warpage or distortion of the battery pack in the first direction Z1. In this case, the connection bars SC may connect the plurality of spacing bars SS each between the large surfaces 15 of the battery cells 10 to each other, and thus, the rigidity of the entire battery pack in the first direction Z1 may be secured.

The connection bar SC may include a lateral connection bar SC1 extending across or along the lateral surfaces 14 of the battery cells 10 and a bottom connection bar SC2 extending across or along the bottom surfaces 12 of the battery cells 10. In this case, the lateral connection bar SC1 may extend across (e.g., in parallel with) the lateral surfaces 14 of the plurality of battery cells 10 arranged in the first direction Z1 to hold an assembly position of the battery cells 10 in the second direction Z2, and the bottom connection bar SC2 may extend across (e.g., in parallel with) the bottom surfaces 12 of the plurality of battery cells 10 arranged in the first direction Z1 to hold an assembly position of the battery cells 10 in the third direction Z3. In an implementation, the lateral connection bar SC1 may support the lateral surfaces 14 of the battery cells 10, and the bottom connection bar SC2 may support the bottom surfaces 12 of the battery cells 10. In an implementation, the lateral connection bar SC1 and the bottom connection bar SC2 may support the lateral surfaces 14 and the bottom surfaces 12 of the battery cells 10 and hold the assembly positions of the battery cells 10 in the second direction Z2 and the third direction Z3, and an assembly position of the spacer S may be held on the battery cells 10 through the lateral connection bar SC1 and the bottom connection bar SC2 supported on the lateral surfaces 14 and the bottom surfaces 12 of the battery cells 10.

The lateral connection bar SC1 and the bottom connection bar SC2 may contribute to the rigidity of the battery pack in the first direction Z1, e.g., the lateral connection bar SC1 and the bottom connection bar SC2 at positions spaced apart from each other in the third direction Z3 may connect the spacing bars SS to each other, thereby strengthening mutual binding between the spacing bars SS and effectively reinforcing the rigidity of the battery pack in the first direction Z1. In an implementation, the bottom connection bar SC2 may extend in the first direction Z1 while supporting the bottom surfaces 12 of the plurality of battery cells 10 arranged in the first direction Z1, and may effectively help prevent the slip between the battery cells adjacent to each other and may contribute to the rigidity of the battery pack in the first direction Z1.

The lateral connection bar SC1 and the bottom connection bar SC2 may be arranged in different orientations. In an implementation, the lateral connection bar SC1 may face the lateral surfaces 14 of the battery cells 10, while the bottom connection bar SC2 may face the bottom surfaces 12 of the battery cells 10. In an implementation, the lateral connection bar SC1 and the bottom connection bar SC2 may be coupled to different portions of the spacing bars SS, e.g., the lateral connection bar SC1 may extend across outer surfaces of the spacing bars SS (e.g., surfaces facing in the second direction Z2), and the bottom connection bar SC2 may extend across bottom surfaces 12 of the spacing bars SS (e.g., surfaces facing in the third direction Z3). In an implementation, the lateral connection bar SC1 may be connected to the outer surfaces of the spacing bars SS in the second direction Z2, e.g., may be connected to protruding surfaces SP protruding toward the outside from the outer surfaces of the spacing bars SS. In this case, the lateral connection bar SC1 may extend across the protruding surfaces SP of the spacing bars SS arranged in the first direction Z1, and may bind the spacing bars SS to each other.

In an implementation, the spacing bars SS may be arranged in or at a front side and a rear side of each of the m number battery cells 10 (e.g., 24 battery cells 10). In an implementation, one spacing bar SS may be arranged in or at a front side and a rear side of each battery cell 10, and one spacing bar SS may be between the battery cells 10 adjacent to each other. In an implementation, as illustrated in FIG. 6, to implement the spacer S extending across the m number battery cells 10 (e.g., 24 battery cells 10) in the first direction Z1, two spacer units SU adjacent to each other in the first direction Z1 may configure or provide two spacing bars SS arranged to overlap or be in close contact with each other between a specific pair of battery cells 10. In an implementation, the two spacing bars SS (e.g., together) may be between the specific pair of battery cells 10. In an implementation, in the case where the plurality of spacer units SU are continuously arranged in the first direction Z1, spacing bars SS1 at adjacent, e.g., facing, ends of the spacer units SU adjacent to each other may overlap or be in close contact with each other. In an implementation, the spacing bars SS1 at the ends may overlap each other between the specific pair of battery cells 10 (e.g., two spacing bars SS1 from two different but adjacent spacer units SU may together protrude between the specific pair of battery cells 10). In an implementation, in the spacer units SU adjacent to each other in the first direction Z1, the spacing bars SS1 at the ends may overlap each other, to provide a structure that is advantageous in the rigidity of the battery pack in the first direction Z1. In another case where spacer units SU adjacent to each other do not overlap each other, a binding force between the spacer units SU adjacent to each other may deteriorate, and thus, the rigidity in the first direction Z1 may also deteriorate. In an implementation, in the spacer units SU adjacent to each other, the spacing bars SS1 at the ends of the spacer units SU may overlap each other and be between the specific pair of battery cells 10, and thus, binding between the spacing bars SS1 at the ends may be strengthened, and accordingly, binding between the spacer units SU (structurally separated from each other) may be also strengthened, and a structure advantageous in rigidity in the first direction Z1 may be provided. In another case where the spacer units SU adjacent to each other do not overlap each other, a lateral surface 14 of one battery cell 10, between one group of the battery cells 10, the lateral surfaces 14 of which are covered by one spacer unit SU and another group of the battery cells 10, the lateral surfaces 14 of which are covered by the spacer unit SU adjacent to the one spacer unit SU, is not covered by any spacer unit SU, and the spacer units SU adjacent to each other may be separated from each other due to the one battery cell 10 therebetween, such that the rigidity of the battery pack in the first direction Z1 may deteriorate.

In an implementation, the specific pair of battery cells 10, between which the spacing bars SS1 of the respective ends of the spacer units SU adjacent to each other overlap each other, may be related to the number n of battery cells 10 (e.g., 4 battery cells 10) that one spacer unit SU extends across. In an implementation, in the case where, as illustrated in FIG. 2, the k number of battery cells 10 (e.g., 12 battery cells 10) are arranged in the first direction Z1 in one module BM, e.g., first, second, . . . , (k−1)th, and kth battery cells are arranged in the first direction Z1 in one module BM, the specific pairs of battery cells 10, each between which the spacing bars SS1 of the respective ends of the spacer units SU adjacent to each other overlap each other, may include an nth battery cell (e.g., a fourth battery cell), an (n+1)th battery cell (e.g., a fifth battery cell), a (2*n)th battery cell (e.g., an eighth battery cell), and a (2*n+1)th battery cell (e.g., a ninth battery cell), e.g., every (n*i, wherein i is an integer)th battery cell and every (n*i+1)th battery cell, in the case where one spacer unit SU extends across the n battery cells 10 (e.g., 4 battery cells 10).

Referring to FIG. 6, the plurality of spacing bar SS may be arranged or spaced apart in the first direction Z1. In an implementation, the spacing bars SS1 at the ends of each spacer unit SU and the spacing bars SS2 at central portions (between the ends of the spacer unit SU in the first direction Z1) may have different thicknesses t1 and t2 (e.g., as measured in the first direction Z1). As described above, in the spacer units SU adjacent to each other, the spacing bars SS1 at the ends adjacent to or facing each other may be arranged to overlap each other between the specific pair of battery cells 10, and the thickness t1 of the spacing bars SS1 at the ends may be half of the thickness t2 of the spacing bars SS2 at the central portions, such that the gaps between the battery cells 10 adjacent to each other are uniform throughout the battery cells 10 arranged in the first direction Z1.

Referring to FIGS. 2 and 3, in an embodiment, the plurality of spacer units SU that are structurally separated from each other may be continuously arranged in the first direction Z1 such that the spacers S extend across all of the battery cells 10. In addition, the plurality of spacer units SU structurally separated from each other and continuously arranged in the first direction Z1, rather than the one spacer S structurally extending in the first direction Z1, may help reduce stress accumulated in the spacers S due to swelling of the battery cells 10. In addition, by including the plurality of spacer units SU structurally separated from each other, all the spacers S may be prevented from being accumulatively deformed due to thermal deformation that could occur during molding, e.g., distortion that may occur in cooling a hot molten resin. In an implementation, in the case of the swelling where the battery cells 10 are swollen during charging and discharging, the battery cells 10 may be forcibly moved accumulatively according to their positions in the first direction Z1. In some cases, the battery cells 10 at both sides of the battery cells 10 at central portions among the m battery cells 10 (e.g., 24 battery cells 10) may be forcibly moved accumulatively according to their specific positions in the first direction Z1, and accordingly, stress accumulation may be caused between the battery cells 10 and the spacers S for restricting positions of the battery cells 10. In an implementation, by partially allowing a position movement in the first direction Z1 through an arrangement of the plurality of spacer units SU structurally separated from each other, the stress accumulation between the battery cells 10 and the spacer units SU may be resolved, e.g., stress accumulation that may be cumulatively generated in a structure in which the plurality of battery cells 10 are arranged may be resolved.

Referring to FIG. 2, the battery pack according to an embodiment may be configured to be expandable in the module BM, e.g., the battery pack may be expandable in the module BM by adding the spacer units SU structurally separated from each other, e.g., by adding another spacer unit SU to the existing module BM without having to replace the spacers S of the existing module BM. The spacer unit SU may be integrally formed of an electrically insulating resin material. In an implementation, the spacer unit SU may be between the battery cells 10 and the side plate 140 to electrically insulate the battery cells 10 from the side plate 140.

Referring to FIGS. 2 and 7, the battery pack according to an embodiment may be configured to be expandable in the module BM, and may include a total of m battery cells 10 (e.g., 24 battery cells 10) while repeating the module BM in the first direction Z1, in which k (k<m) number of battery cells 10 (e.g., 12 battery cells 10) are in one module. In an implementation, the m battery cells 10 (e.g., 24 battery cells 10) constituting the battery pack may be divided into the modules BM each including the k battery cells 10 (e.g., 12 battery cells 10). In this case, the m number of battery cells 10 (e.g., 24 battery cells 10) of the battery pack may be a (e.g., whole number) multiple of the k number of battery cells 10 (e.g., 12 battery cells 10) constituting one module BM. In an implementation, the battery pack may include a total of 24 battery cells 10, and two modules BM may be continuously arranged, in which 12 battery cells 10 are in each module BM. In an implementation, a second end block 120 may be arranged between the modules BM adjacent to each other (e.g., in the first direction Z1). In addition to the second end block 120 arranged between the modules BM adjacent to each other, the pair of first end blocks 110 may be arranged at a front side and a rear side of the battery pack, and the first and second end blocks 110 and 120 may have substantially the same structure. The detailed technical features of the first and second end blocks 110 and 120 will be described below.

The total of m battery cells 10 (e.g., 24 battery cells 10) arranged in the first direction Z1 may be entirely covered by (e.g., laterally between) the pair of first end blocks 110 and a pair of the side plates 140. The pair of first end blocks 110 and the pair of side plates 140 may cover outer (e.g., lateral) surfaces of all the battery cells 10, to bind all the battery cells 10 in a single pack structure and secure the structural rigidity of the battery pack. In an implementation, the side plate 140 may extend (e.g., lengthwise) in the first direction Z1, and the first end block 110 may extend (e.g., lengthwise) in the second direction Z2. The side plate 140 and the first end block 110 may be coupled to each other by welding or the like at a corner where the side plate 140 and the first end block 110 contact each other, to cover the outer surfaces of all the battery cells 10 in the first direction Z1 and the second direction Z2. The pair of first end blocks 110 may be arranged at the front and rear of all the battery cells 10 (e.g., the collective row of battery cells 10) in the first direction Z1, respectively, and may extend (e.g., lengthwise) in the second direction Z2 to cover the foremost (e.g., of a front one of the battery cells 10) and rearmost (e.g., of a rear one of the battery cells 10) large surfaces 15 of all the battery cells 10, respectively. The pair of side plates 140 may be arranged to face each other in the second direction Z2 with the battery cells 10 therebetween, and may extend in the first direction Z1 to cover the lateral surfaces 14 of the battery cells 10.

The first end blocks 110 may cover the front and rear of the total of m battery cells 10 (e.g., 24 battery cells 10) arranged in the first direction Z1 (e.g., the front side and the rear side of the entire row of battery cells 10), and may cover the foremost large surface 15 of the foremost or front battery cell 10 and rearmost large surface 15 of the rearmost or rear battery cell 10, e.g., at both or opposite ends (of the row of battery cells 10) in the first direction Z1. The pair of first end blocks 110 may be at both ends of all the battery cells 10 in the first direction Z1, may structurally bind all the battery cells 10 in the first direction Z1, and may insulate and protect the battery cells 10 from external environments. The outer surface of the battery cell 10 may have an electrical polarity according to a specific structure, and the battery cell 10 may be insulated from the external environments by covering the battery cell 10 with the first end blocks 110 having electrical insulation. In an implementation, the first end block 110 may be formed of an insulating resin material, and may cover or face the large surface 15 of the battery cell 10 with the resin material that is advantageous in terms of rigidity, such that curved swelling of the large surface 15 of the battery cell 10 may be effectively suppressed, and a change in electrical characteristics due to deformation of the battery cell 10 and a consequent deterioration in charging and discharging characteristics may be effectively prevented.

In an implementation, the first end block 110 may be hollow, e.g., having at least a portion thereof empty, and accordingly, the battery pack may be advantageous in reducing production costs and in reducing its weight. The first end block 110 may be formed entirely of a resin material, and coupling blocks 110c protruding in the second direction Z2 may be at both ends of the first end block 110. The coupling blocks 110c at both ends of the first end block 110 may provide position alignment with coupling ends 140c at both ends of the side plate 140, e.g., the first end block 110 and the side plate 140 may be coupled to each other by welding or fastening using a separate fastener, e.g., a bolt, between the first end block 110 and the end of the side plate 140 in a state in which the coupling block 110c and the coupling end 140c are aligned with respect to each other.

Bush units or coupling holes 110a may be at both ends of the first end block 110. The coupling holes 110a may have a hollow shape, e.g., a hollow cylindrical shape, and a fastener inserted into the coupling holes 110a may be fastened to a mounting plate on which the battery pack is mounted, accordingly, the entire battery pack may be fixed on the mounting plate. The mounting plate may be in an apparatus in which the battery pack is mounted, and may be provided in, e.g., an electric vehicle to provide an installation place of the battery pack. In an implementation, the coupling holes 110a may be at four symmetrical positions of the battery pack, e.g., at both ends, in the second direction Z2, of the pair of the first end blocks 110 that cover the foremost and rearmost battery cells 10 in the first direction Z1, such that the battery pack may be stably fixed in the apparatus.

The pair of first end blocks 110 may be arranged at both ends of the total of m battery cells 10 (e.g., 24 battery cells 10) arranged in the first direction Z1, and, in the battery pack expanded with additional modules BM, with k number of battery cells 10 (e.g., 12 battery cells 10) in each module BM, the second end block 120 may be arranged between the modules BM adjacent to each other. The second end block 120 may have substantially the same structure as that of the first end block 110, a detailed structure of the second end block 120 may be substantially the same as that of the first end block 110, and a repeated description thereof may be omitted. In an implementation, coupling blocks 120c at both ends of the second end block 120 may be aligned with the coupling ends 140c of the side plates 140, and the entire battery pack may be firmly fixed through the fasteners fastened to the mounting plate by passing through the coupling holes 120a at both ends of the second end blocks 120.

As will be described below, when expanding the battery pack with additional modules BM, the first end block 110 of the existing module BM may then function as the second end block 120 when adding of the additional modules BM, and thus, the first and second end blocks 110 and 120 may have substantially the same structure.

The battery pack according to an embodiment may be configured to be expandable in the module BM. In an implementation, upon addition of a new module BM, any one of the first end blocks 110 arranged at both ends of the existing module BM may then be the second end block 120 from or at which the new module BM is added, such that the second end block 120 is between the first end block 110 arranged at the end of the new module BM and the first end block 110 of the existing module BM.

The coupling blocks 120c may be at both ends of the second end block 120 between the existing module BM and the new module BM, and after the coupling blocks 120c of the second end block 120 are aligned with the coupling ends 140c of the side plates 140, the second end block 120 and the side plates 140 may be coupled to each other to secure the rigidity in the first direction Z1, and by securing rigidity between the modules BM adjacent to each other, the warpage or distortion of the battery pack in the first direction Z1 may be reduced or prevented.

The coupling holes 120a may be at both ends of the second end block 120 between the existing module BM and the new module BM, and the fastener passing through the coupling holes 120a of the second end block 120 may be fastened to the mounting plate, and thus, a fastening position of the battery pack may be additionally provided between the pair of first end blocks 110 in addition to the pair of first end blocks 110 at both ends of the battery pack, and accordingly, the battery pack that extends in the module BM may be stably fixed on the mounting plate.

The side plates 140 may extend in the first direction Z1, may extend across the lateral surfaces 14 of the total of m battery cells 10 (e.g., 24 battery cells 10) arranged in the first direction Z1, and may cover the lateral surfaces 14 of the battery cells 10. The side plates 140 may extend in the first direction Z1 to contribute to the rigidity of the battery pack in the first direction Z1, and may facilitate the rigidity to resist the warpage or distortion in the first direction Z1. Reinforcing ribs 140b (having a concave or convex shape) may be in or on the side plate 140. In an implementation, the reinforcing rib 140b may extend in the first direction Z1 over or along an entire length of the side plate 140 and may be concave to face the battery cells 10 from an inner surface of the side plate 140. In an implementation, the reinforcing rib 140b may be concave from the inner surface of the side plate 140 to face the battery cells 10, and an outer surface of the side plate 140 may be flat, such that interference with a space inside the apparatus in which the battery pack is mounted may be avoided. In this case, the reinforcing ribs 140b of the side plate 140 may also accommodate the protruding surfaces SP (see FIG. 3) of the spacer S and may be formed to be concave to accommodate the protruding surfaces SP of the spacer S.

The side plates 140 may extend across the lateral surfaces 14 of the battery cells 10 in the first direction Z1 to contribute to heat dissipation of the battery cells 10, and to this end, the side plates 140 may be formed of a metal material having excellent heat dissipation characteristics, e.g., aluminum or an aluminum alloy. In addition, the side plate 140 made of the metal material may provide a structure with excellent impact resistance characteristics.

The pair of coupling ends 140c forming the ends of the side plate 140 may be at both (e.g., opposite) ends of the side plate 140 in the first direction Z1, and the first end block 110 and the side plate 140 may be coupled to each other by welding or fastening using the separate fastener, e.g., a bolt, between the first end block 110 and the end of the side plate 140 in a state in which the coupling block 110c and the coupling end 140c are aligned with respect to each other. As described above, the outer surfaces of the battery cells 10 may be covered by the side plates 140 and the first end blocks 110 coupled to each other.

The side plate 140 may face the lateral surfaces 14 of the battery cells 10 with the spacer S therebetween, and may fix a position of the spacer S such that the spacer S is not separated from between the battery cells 10 adjacent to each other, e.g., by holding or pressing the spacer S toward the battery cells 10. The spacers S may be formed of an insulating resin to electrically insulate the battery cells 10 from the side plates 140.

The battery pack according to an embodiment may be expandable in the module BM, and the side plate 140 may be added in the module BM. In an implementation, the side plates 140 may be implemented in two or more side plates 140 divided in the module BM. In an implementation, the battery pack may be expanded in the module BM in such a manner that a new side plate 140 may be additionally coupled to the side plate 140 of the existing module BM to extend an entire length of the side plates 140. In an implementation, the coupling end 140c at the end of the side plate 140 of the existing module BM and the coupling end 140c at the end of the new side plate 140 of the new module BM may be aligned with respect to the coupling block 120c of the second end block 120 between the existing module BM and the new module BM, and the side plate 140 of the existing module BM and the new side plate 140 of the new module BM may be coupled to each other on the second end block 120 by welding or coupling, to enable the battery back to be expanded in the module BM. In an implementation, the new module BM may be added from or at the second end block 120 such that any one of the pair of first end blocks 110 at ends of the existing module BM may function as the second end block 120 (of the expanded battery module BM), and in this case, the side plate 140 of the existing module BM may be already welded to the second end block 120. By further welding the new side plate 140 of the new module BM to the second end block 120 to which the side plate 140 of the existing module BM has been welded, a structure in which the side plate 140 of the existing module BM and the new side plate 140 are welded to the second end block 120 between the existing module BM and the new module BM may be implemented, and as a result, the side plates 140 may be expanded in the module BM.

The side plate 140 may include a protruding piece 140a supporting the terminal surfaces 11 of the battery cells 10. The protruding piece 140a may protrude from a body of the side plate 140 (covering the lateral surfaces 14 of the battery cells 10) toward (e.g., over) the battery cells 10 and may support (e.g., face) the terminal surfaces 11 of the battery cells 10. In an implementation, the protruding piece 140a may support the terminal surfaces 11 of the battery cells 10 by interposing an edge of a bus bar holder BH extending across the terminal surfaces 11 of the battery cells 10. In an implementation, the bus bar holder BH may be between the protruding piece 140a and the terminal surfaces 11 of the battery cells 10. The detailed technical features of the bus bar holder BH will be described below.

In an implementation, an additional protruding piece may be formed on the side plate 140 to support the bottom surfaces 12 of the battery cells 10. In an implementation, the additional protruding piece may protrude from the body of the side plate 140 (covering the lateral surfaces 14 of the battery cells 10) toward (e.g., under) the battery cells 10 to support the bottom surfaces 12 of the battery cells 10 or directly support the bottom surfaces 12 of the battery cells 10. In an implementation, the bottom surfaces 12 of the battery cells 10 may be supported by the bottom connection bar SC2 (see FIG. 5B) of the spacer S, and the additional protruding piece of the side plate 140 may be omitted. In an implementation, the bottom connection bar SC2 of the spacer S and the additional protruding portion of the side plate 140 may overlap each other on the bottom surfaces 12 of the battery cells 10, thereby causing interference.

In an implementation, the battery cells 10 may be more firmly fixed with the protruding pieces 140a of the side plates 140 supporting the terminal surfaces 11 of the battery cells 10 and the bottom connection bars SC2 (see FIG. 5B) of the spacers S supporting the bottom surfaces 12 of the battery cells 10. In an implementation, the protruding piece 140a may be bent from the body of the side plate 140 toward the battery cells 10 to reinforce rigidity of the side plate 140 and the rigidity of the entire battery pack in the first direction Z1.

Referring to FIG. 2, the bus bar holder BH may be arranged on the terminal surfaces 11 of the battery cells 10. The bus bar holder BH may guide assembly positions of bus bars B electrically connected to the first and second electrode terminals 11a and 11b on the terminal surfaces 11 of the battery cells 10, and may maintain the assembly positions of the bus bars B at normal positions. In addition, the bus bar holder BH may block electrical interference between the battery cells 10 and the bus bars B and may block electrical interference between a circuit unit arranged on the bus bar holder BH and the battery cells 10.

In an implementation, the bus bar holder BH may extend across the terminal surfaces 11 of the plurality of battery cells 10 to guide the assembly positions of a plurality of bus bars B electrically connected to the plurality of battery cells 10. A plurality of terminal holes exposing the first and second electrode terminals 11a and 11b of the battery cells 10, respectively, may be arranged on the bus bar holder BH, and the bus bars B may be coupled to the first and second electrode terminals Ila and 1 lb exposed from the bus bar holder BH through the terminal holes, to electrically connect the battery cells 10 to each other. In an implementation, the first and second electrode terminals 11a and 11b exposed through the terminal holes of the bus bar holder BH may be coupled to the bus bars B by welding.

In an implementation, after the spacers S are assembled onto the lateral surfaces 14 of the battery cells 10, the bus bar holder BH may be assembled onto the terminal surfaces 11 of the battery cells 10, and then the side plates 140 may be sequentially assembled onto the spacers S assembled onto the lateral surfaces 14 of the battery cells 10. In an implementation, the spacers S may be assembled to face each other at opposite lateral surfaces 14 of the battery cells 10 therebetween, such that the lateral connection bars SC1 and the bottom connection bars SC2 of the spacers S extend across the lateral surfaces 14 and the bottom surfaces 12 of the battery cell 10, respectively. After the bus bar holder BH is arranged on the terminal surfaces 11 of the battery cells 10, the side plates 140 may be assembled to face each other at both lateral surfaces 14 of the battery cells 10 therebetween, such that the protruding pieces 140a formed on the side plates 140 are put on the edges of the bus bar holder BH arranged on the terminal surfaces 11 of the battery cells 10.

Figure 8:
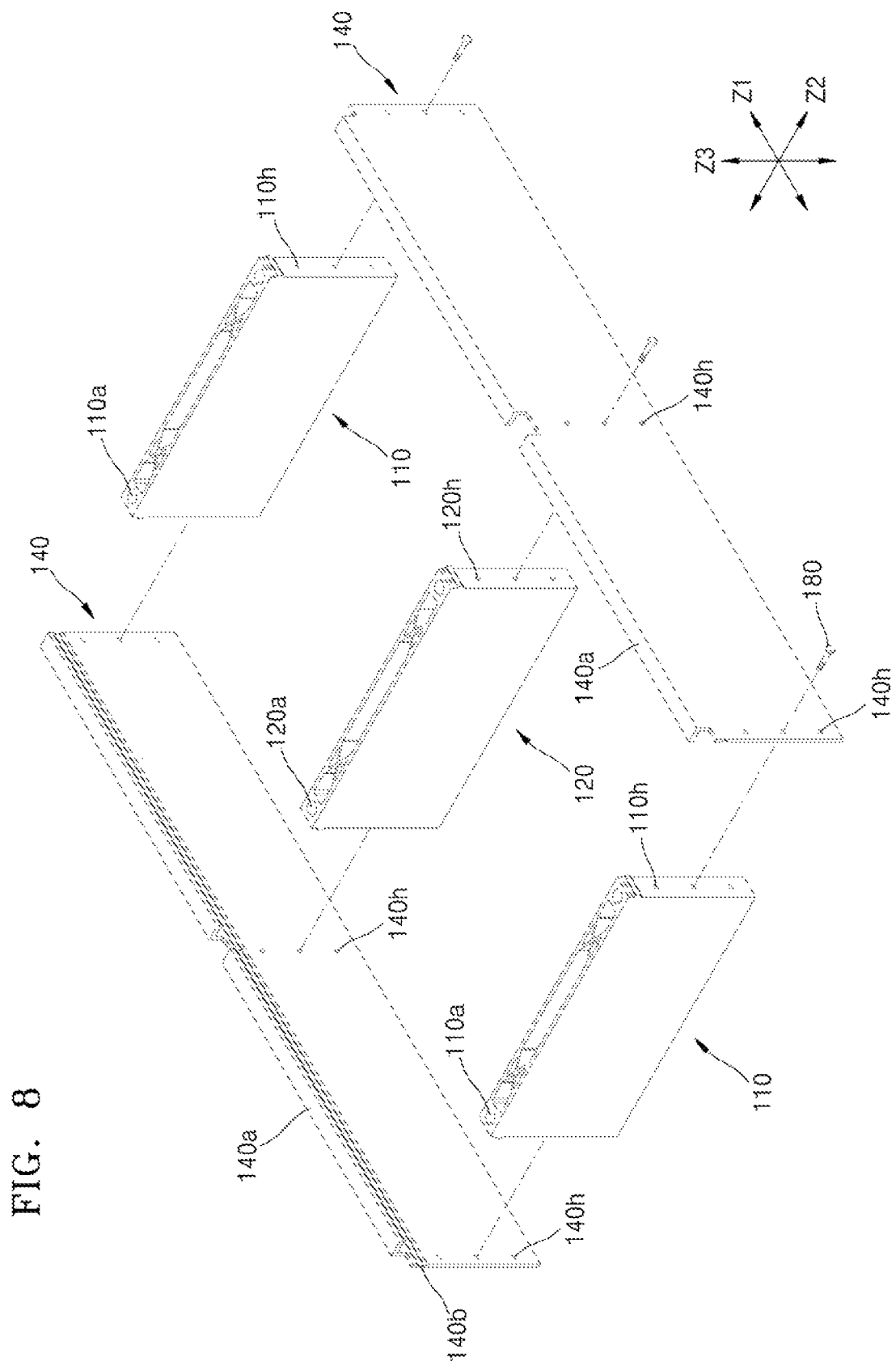
FIG. 8 is an exploded perspective view of a battery pack according to an embodiment modified from that of FIG. 7, illustrating coupling between the first and second end blocks and side plates.

FIG. 8 is a diagram of coupling between the first and second end blocks and the side plates according to an embodiment modified from that of FIG. 7.

Referring to FIG. 8, coupling holes 140h may be at both ends of the side plate 140 in the first direction Z1, and the first end blocks 110 and the side plates 140 may be coupled to each other by fastening using bolts 180 in a state in which the coupling holes 140h of the side plates 140 are aligned with the coupling holes 110h at both ends of the first end blocks 110. As described above, the outer surfaces of all the battery cells 10 may be covered by the side plates 140 and the first end blocks 110 coupled to each other. In addition, the coupling holes 120h at both ends of the second end block 120 may be aligned with the coupling holes 140h of the side plates 140, and the entire battery pack may be firmly fixed by the fasteners fastened to the mounting plate through the coupling holes 120a at both ends of the second end block 120.

By way of summation and review, small mobile devices such as mobile phones may operate for a predetermined time by using an output and a capacity of a single battery. In the case of electric automobiles or hybrid automobiles, which may have large power consumption, a long driving time, and high-power driving, battery packs may be used to meet the power and capacity requirements, and an output voltage or an output current of a battery pack may increase as the number of battery cells embedded therein increases.

One or more embodiments may provide a battery pack to which a spacer structure capable of reinforcing structural rigidity in an arrangement direction of battery cells while providing a gap capable of accommodating swelling between the battery cells adjacent to each other is applied.

One or more embodiments may provide a battery pack configured to be expandable in a module unit.

Example embodiments have been disclosed herein, and although specific terms are employed, they are used and are to be interpreted in a generic and descriptive sense only and not for purpose of limitation. In some instances, as would be apparent to one of ordinary skill in the art as of the filing of the present application, features, characteristics, and/or elements described in connection with a particular embodiment may be used singly or in combination with features, characteristics, and/or elements described in connection with other embodiments unless otherwise specifically indicated.

Accordingly, it will be understood by those of skill in the art that various changes in form and details may be made without departing from the spirit and scope of the present invention as set forth in the following claims.

What is claimed is:

1. A battery pack, comprising:
   m number of battery cells arranged in a first direction; and
   spacers on the battery cells, the spacers each including a plurality of spacer units arranged in the first direction,
   wherein:
   each of the spacer units extends across n number of the battery cells, in which n<m,
   each of the spacer units includes:
      a plurality of spacing bars, each of the spacing bars being between adjacent ones of the battery cells, and
      connection bars connecting the plurality of spacing bars to each other,
   each of the spacer units includes the spacing bars at both ends thereof and at central portions between the ends thereof, in the first direction,
   the spacer units are adjacent to each other in the first direction,
   spacing bars of the plurality of spacing bars at the ends of adjacent spacer units overlap each other and are between adjacent ones of the battery cells, and
   spacing bars of the plurality of spacing bars at the central portions of a corresponding spacer unit are between adjacent ones of the battery cells.

2. The battery pack as claimed in claim 1, wherein, with respect to a number n of battery cells that one spacer unit extends across, a total number m of battery cells is a multiple of the number n of battery cells that one spacer unit extends across.

3. The battery pack as claimed in claim 1, wherein:
   the m number of battery cells arranged in the first direction are arranged in two or more modules, and
   each of the modules includes k number of battery cells, in which k<m.

4. The battery pack as claimed in claim 3, wherein m is a positive integer multiple of k such that $m=p*k$, in which p is a positive integer.

5. The battery pack as claimed in claim 3, wherein k is a positive integer multiple of n such that $k=p*n$, in which p is a positive integer.

6. The battery pack as claimed in claim 3, further comprising:
   a pair of first end blocks respectively at a front end and a rear end of the m number of battery cells arranged in the first direction; and
   a second end block between adjacent modules of the two or more modules,
   wherein the first end blocks each have substantially the same structure as the second end block.

7. The battery pack as claimed in claim 1, wherein:
   the plurality of spacing bars are arranged in the first direction such that a pair of the spacing bars face each other in a second direction intersecting with the first direction with a battery cell therebetween, and
   each of the spacing bars extends lengthwise in a third direction intersecting with the first direction and the second direction.

8. The battery pack as claimed in claim 1, wherein each of the battery cells includes:
   a terminal surface including at least one electrode terminal thereon,
   a bottom surface opposite to the terminal surface,
   a pair of large surfaces that connect the terminal surface to the bottom surface and that each have a first area, and
   a pair of lateral surfaces that connect the terminal surface to the bottom surface and that each have a second area, the second area being smaller than the first area.

9. The battery pack as claimed in claim 8, wherein the plurality of spacing bars are respectively between the large surfaces of adjacent battery cells.

10. The battery pack as claimed in claim 9, wherein the plurality of spacing bars:
    protrude from the connection bars on the lateral surfaces of the battery cells in a second direction intersecting with the first direction, and
    are respectively between the large surfaces of adjacent battery cells.

11. The battery pack as claimed in claim 1, wherein spacing bars of the plurality of spacing bars at the ends of one spacer unit have a thickness that is half of a thickness of the plurality of spacing bars at the central portion of the one spacer unit.

12. The battery pack as claimed in claim 1, wherein the connection bars extend in the first direction and connect the plurality of spacing bars arranged in the first direction.

13. The battery pack as claimed in claim 12, wherein the connection bars include:
    a lateral connection bar extending in the first direction across lateral surfaces of the battery cells; and
    a bottom connection bar extending in the first direction across bottom surfaces of the battery cells.

14. The battery pack as claimed in claim 13, wherein:
    the lateral connection bar extends across outer surfaces of the plurality of spacing bars in a second direction intersecting with the first direction, and
    the bottom connection bar extends across bottom surfaces of the plurality of spacing bars in a third direction intersecting with the first direction and the second direction.

15. The battery pack as claimed in claim 13, wherein the lateral connection bar and the bottom connection bar are spaced apart from each other in a third direction that intersects with the first direction and intersects a second direction in which the lateral surfaces of the battery cells adjacent to each other face.

16. The battery pack as claimed in claim 13, wherein:
the lateral connection bar faces the lateral surfaces of the battery cells, and
the bottom connection bar faces the bottom surfaces of the battery cells.

17. The battery pack as claimed in claim 13, wherein the bottom connection bar supports bottom surfaces of the battery cells.

18. The battery pack as claimed in claim 1, further comprising:
side plates extending in the first direction and covering outer sides of the spacers; and
a pair of first end blocks arranged at a front side of a foremost battery cell of the m number of battery cells arranged in the first direction and at a rear side of a rearmost battery cell of the m number of battery cells arranged in the first direction.

19. The battery pack as claimed in claim 18, wherein:
the side plate covers lateral surfaces of the battery cells, the spacers being between the side plate and the lateral surfaces of the battery cells, and
the first end blocks cover large surfaces of the foremost battery cell of the m number of battery cells arranged in the first direction and the rearmost battery cell of the m number of battery cells arranged in the first direction.

20. The battery pack as claimed in claim 18, wherein the spacers and the side plates are in pairs that face each other with the battery cells therebetween in a second direction intersecting with the first direction.

21. The battery pack as claimed in claim 18, wherein:
the m number of battery cells are arranged in the first direction in two or more modules, in which k number of battery cells are in each module, and in which k<m, and
the side plates include two or more side plates coupled to each other on each module.

22. The battery pack as claimed in claim 18, wherein the first and second end blocks each include hollow coupling holes at opposite ends thereof in a second direction intersecting with the first direction.

23. The battery pack as claimed in claim 18, wherein the first end blocks each include coupling blocks at opposite ends thereof in in a second direction intersecting with the first direction,
the side plate includes coupling ends at opposite ends thereof, and
the coupling blocks are aligned with the coupling ends.

24. The battery pack as claimed in claim 18, further comprising bus bar holders on terminal surfaces of the battery cells,
wherein the side plate includes a protruding piece that protrudes from a body of the side plate covering lateral surfaces of the battery cells toward the terminal surfaces and supports the terminal surfaces by supporting an edge of the bus bar holder.

25. The battery pack as claimed in claim 2, wherein:
each of the spacer units is the same size, and
m is a positive integer multiple of n such that m=p*n, in which p is a positive integer.

* * * * *